United States Patent
Reynolds et al.

(10) Patent No.: US 9,315,664 B2
(45) Date of Patent: Apr. 19, 2016

(54) HIGH $T_g$ EPOXY SYSTEMS FOR COMPOSITE APPLICATIONS

(71) Applicant: Dow Global Technologies LLC, Midland, MI (US)

(72) Inventors: Jeffery L. Reynolds, Lake Jackson, TX (US); Rajesh H. Turakhia, Lake Jackson, TX (US); George C. Jacob, Newark, DE (US); Marty J. Null, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 32 days.

(21) Appl. No.: 14/264,105

(22) Filed: Apr. 29, 2014

(65) Prior Publication Data

US 2014/0235792 A1    Aug. 21, 2014

Related U.S. Application Data

(63) Continuation of application No. 12/811,230, filed as application No. PCT/US2009/030096 on Jan. 5, 2009, now Pat. No. 8,742,018.

(60) Provisional application No. 61/019,788, filed on Jan. 8, 2008.

(51) Int. Cl.

| | |
|---|---|
| *C08G 59/14* | (2006.01) |
| *C08G 59/24* | (2006.01) |
| *C08G 59/42* | (2006.01) |
| *C08L 63/00* | (2006.01) |
| *C08G 59/22* | (2006.01) |
| *C08G 59/32* | (2006.01) |
| *C08G 59/50* | (2006.01) |
| *C08G 59/68* | (2006.01) |

(52) U.S. Cl.

CPC .............. *C08L 63/00* (2013.01); *C08G 59/226* (2013.01); *C08G 59/24* (2013.01); *C08G 59/3218* (2013.01); *C08G 59/42* (2013.01); *C08G 59/4215* (2013.01); *C08G 59/5093* (2013.01); *C08G 59/686* (2013.01)

(58) Field of Classification Search
None
See application file for complete search history.

(56) References Cited

U.S. PATENT DOCUMENTS

| | | | | |
|---|---|---|---|---|
| 4,178,274 | A * | 12/1979 | Denk et al. | 523/427 |
| 4,665,111 | A * | 5/1987 | Hussain et al. | 523/428 |
| 5,189,080 | A * | 2/1993 | Heyke et al. | 523/212 |
| 8,742,018 | B2 * | 6/2014 | Reynolds | C08G 59/24 525/109 |
| 8,853,734 | B2 * | 10/2014 | Takenaka et al. | 257/100 |
| 2010/0292415 | A1 * | 11/2010 | Reynolds et al. | 525/533 |

FOREIGN PATENT DOCUMENTS

WO    WO 2011/093219 A1 *   8/2011

* cited by examiner

*Primary Examiner* — Robert Sellers
(74) *Attorney, Agent, or Firm* — Hong J. Xu

(57) ABSTRACT

A thermoset resin, including the reaction product of: an epoxy resin mixture including at least one cycloaliphatic epoxy resins; a cycloaliphatic anhydride hardener; and a catalyst; wherein the reaction product has a glass transition temperature greater than or equal to 210° C. Also disclosed is a process for forming a thermoset resin, including: admixing two or more epoxy resins and a cycloaliphatic anhydride hardener to form a curable composition, wherein the epoxy resins include at least one cycloaliphatic epoxy resin; thermally curing the curable composition at a temperature of at least 150° C. to result in a thermoset resin having a glass transition temperature of at least 210° C. Such curable compositions may include: 35 to 65 weight percent of an epoxy resin mixture having at least one cycloaliphatic epoxy resins; 35 to 65 weight percent of a cycloaliphatic anhydride hardener; and from greater than 0 to 10 weight percent of a catalyst.

8 Claims, No Drawings

HIGH $T_g$ EPOXY SYSTEMS FOR COMPOSITE APPLICATIONS

This application is a continuation of application Ser. No. 12/811,230 filed Jun. 30, 2010, now U.S. Pat. No. 8,742,018, filed under 37 CFR 1.371 as PCT/US2009/030096 filed Jan. 5, 2009 claiming the benefit of provisional application No. 61/019,788 filed Jan. 8, 2008.

BACKGROUND OF DISCLOSURE

1. Field of the Disclosure

Embodiments disclosed herein relate generally to curable compositions and thermoset resins formed from such curable compositions. The curable compositions, for example, may include an admixture of cycloaliphatic epoxy resins or an admixture of a) a cycloaliphatic epoxy resin; b) one or more of a flexibilized cycloaliphatic resin, an epoxy phenolic novolac resin, an epoxy bisphenol A novolac resin, a multifunctional epoxy resin, a bisphenol-A or bisphenol F based epoxy resin, and a polyether polyol c) a catalyst; and d) one or more cycloaliphatic anhydride hardeners. Hardeners used in the curable compositions may include cycloaliphatic anhydrides.

2. Background

Epoxies resins are one of the most widely used engineering resins, and are well-known for their use in composites with high strength fibers. Epoxy resins form a glassy network, exhibit excellent resistance to corrosion and solvents, good adhesion, reasonably high glass transition temperatures, and adequate electrical properties. Unfortunately, crosslinked, glassy epoxy resins with relatively high glass transition temperatures (>100° C.) are brittle. The poor impact strength of high glass transition temperature epoxy resins limits the usage of epoxies as structural materials and in composites.

The impact strength, fracture toughness, ductility, as well as most other physical properties of crosslinked epoxy resins may be controlled by the chemical structure and ratio of the epoxy resin and hardener, by any added macroscopic fillers, toughening agents, and other additives, and by the curing conditions used. Typical performance requirements of thermoset resins, including epoxies, include a high softening point (>200° C.), low flammability, hydrolytic resistance, chemical and solvent resistance, and dielectric rigidity.

Performance criteria for the compositions during storage, cure, and for the thermoset resins formed from epoxies vary. In some industries, a slow curing resin may be acceptable, such as where the resin cures over an extended time period of hours or days. However, other uses require the curable epoxy compositions to have a high reactivity, curing only after a brief exposure to elevated temperatures. Unfortunately, high reactivity often leads to one or more undesired properties in the resulting thermoset resin.

Accordingly, there exists a need for epoxy compositions having a relatively low viscosity and a relatively high reactivity, and where the resulting thermoset resin has a good balance of a high glass transition temperature, tensile strength, tensile modulus, and elongation properties.

SUMMARY OF THE DISCLOSURE

In one aspect, embodiments disclosed herein relate to a thermoset resin, including the reaction product of: an epoxy resin mixture, wherein the epoxy resin mixture comprises at least one cycloaliphatic epoxy resins; a cycloaliphatic anhydride hardener; and a catalyst; wherein the reaction product has a glass transition temperature greater than or equal to 210° C. as measured by DSC or DMTA.

In another aspect, embodiments disclosed herein relate to a process for forming a curable composition, including admixing an epoxy resin mixture, a catalyst, and a cycloaliphatic anhydride hardener to form a curable composition, wherein the epoxy resin mixture comprises at least one cycloaliphatic epoxy resin.

In another aspect, embodiments disclosed herein relate to a process for forming a thermoset resin, including: admixing two or more epoxy resins and a cycloaliphatic anhydride hardener to form a curable composition, wherein the two or more epoxy resins include at least one cycloaliphatic epoxy resin; thermally curing the curable composition at a temperature of at least 150° C. to result in a thermoset resin having a glass transition temperature of at least 210° C. as measured by DSC or DMTA.

In another aspect, embodiments disclosed herein relate to curable compositions including 35 to 65 weight percent of an epoxy resin mixture, wherein the epoxy resin mixture comprises at least one cycloaliphatic epoxy resins; 35 to 65 weight percent of a cycloaliphatic anhydride hardener; and from greater than 0 to 10 weight percent of a catalyst; wherein the weight percentages given are based on the combined weight of the epoxy resin mixture and the hardener.

In another aspect, embodiments disclosed herein relate to a composites and other end use articles formed from the curable compositions and thermoset resins described herein.

Other aspects and advantages will be apparent from the following description and the appended claims.

DETAILED DESCRIPTION

In one aspect, embodiments disclosed herein relate to curable compositions and thermoset resins formed from such curable compositions. The curable compositions, for example, may include an admixture of cycloaliphatic epoxy resins. Hardeners used in the curable compositions may include, for examples, cycloaliphatic anhydrides. In a family of embodiments, curable compositions disclosed herein may include an admixture of a) a cycloaliphatic epoxy resin; b) one or more of a flexibilized cycloaliphatic resin, an epoxy phenolic novolac resin, an epoxy bisphenol A novolac resin, a multifunctional epoxy resin, a bisphenol-A or bisphenol F based epoxy resin, and a polyether polyol c) a catalyst; and d) one or more cycloaliphatic anhydride hardeners.

Such compositions may exhibit low viscosities and high reactivity, suitable for use in composites and coating applications. Upon cure, such as a thermal cure, the resulting thermoset resins may have a good balance of physical properties, including a high glass transition temperature, a high tensile strength, a high tensile modulus, and a high elongation at break.

Curable compositions described herein, formed from an admixture of cycloaliphatic epoxy resins or an admixture of a) a cycloaliphatic epoxy resin; b) one or more of a flexibilized cycloaliphatic resin, an epoxy phenolic novolac resin, an epoxy bisphenol A novolac resin, a multifunctional epoxy resin, a bisphenol-A or bisphenol F based epoxy resin, and a polyether polyol, c) a catalyst; and d) one or more cycloaliphatic anhydride hardeners, may have a viscosity less than about 10000 mPa-s (ASTM D-445 at 25° C.), in some embodiments. In other embodiments, curable compositions disclosed herein may have a viscosity of less than about 7500 mPa-s; less than about 5000 mPa-s in other embodiments; less than about 2500 mPa-s in other embodiments; less than about 1750 mPa-s in other embodiments; and less than about 1000 mPa-s in yet other embodiments.

Thermoset resins disclosed herein may have a glass transition temperature ($T_g$) of at least 210° C. in some embodiments, as measured by differential scanning calorimetry (DSC) or dynamic mechanical thermal analysis (DMTA; as per ASTM D5045). In other embodiments, thermoset resins disclosed herein may have a glass transition temperature of at least 215° C.; at least 220° C. in other embodiments; at least 222° C. in other embodiments; at least 223° C. in other embodiments; at least 224° C. in other embodiments; at least 225° C. in other embodiments; and at least 226° C. in yet other embodiments.

Measurement of glass transition temperature by DSC may be performed, for example, using a Q100 DSC from T.A. Instruments, set up for 10° C./min scans. Sample sizes is typically kept under 15 mg. Hermetic pans with holes punched in the lids may be used to contain the samples in the DSC cell. DSC scans are analyzed for final $T_g$ using half extrapolated tangents ($T_g$ analysis).

Measurement of glass transition temperature by DMTA may be performed, for example, as per ASTM D5045 at an angular frequency of 1 Hz and 0.1% strain, run on three rectangular samples. The temperature range chosen for these tests may be between 30 and 2800° C. The sample size is typically 17 mm long, 13 mm wide and 4 mm thick. The samples are inserted between adjustable clamps and the clamps are closed using a torque wrench. The samples are then subjected to oscillations in torsion mode. Samples are subjected to a dynamic temperature ramp at 3° C./min. A slower heating rate of 3° C./min may be employed to maintain thermal equilibrium and considering the thermal mass of the sample. Storage and Loss modulus as well as Tangent delta are recorded.

Thermoset resins disclosed herein may have a tensile modulus of at least 250000 psi, as measured according to ASTM D638, in some embodiments. In other embodiments, thermoset resins disclosed herein may have a tensile modulus of at least 255000 psi; at least 260000 psi in other embodiments; at least 270000 in other embodiments; and at least 280000 in yet other embodiments.

Thermoset resins disclosed herein may have an elongation at break of at least 4 percent, as measured according to ASTM D638, in some embodiments. In other embodiments, thermoset resins disclosed herein may have an elongation at break of at least 4.5 percent; at least 5 percent in other embodiments; at least 5.5 percent in other embodiments; and at least about 6 percent in yet other embodiments.

Thermoset resins disclosed herein may have a peak stress of at least 7000 psi, as measured according to ASTM D638, in some embodiments. In other embodiments, Thermoset resins disclosed herein may have a peak stress of at least 7250 psi; at least about 7500 in yet other embodiments; and at least about 7850 in yet other embodiments.

The above described thermoset resins may be formed by admixing an epoxy resin mixture, a catalyst, and a cycloaliphatic anhydride hardener to form a curable composition, and exposing the curable composition to elevated temperatures, such as greater than or equal to about 150° C. in some embodiments, greater than or equal to about 175° C. in other embodiments, and greater than or equal to about 200° C. in yet other embodiments. The curable compositions disclosed herein, as mentioned above, exhibit high reactivity, and curing of the compositions may be performed by exposing the curable compositions to the above described temperatures for a time period of less than or equal to about 5 minutes in some embodiments; less than or equal to about 3 minutes in other embodiments; less than or equal to about 2 minutes in other embodiments; less than or equal to about 1 minute in other embodiments; and less than or equal to about 45 seconds in yet other embodiments.

As described above, curable compositions and thermoset resins may be formed from an epoxy resin mixture, including a mixture of cycloaliphatic epoxy resins or a mixture of at least one cycloaliphatic epoxy resin with a bisphenol-A based epoxy resin and a cycloaliphatic anhydride hardener. Other epoxy resins, additional hardeners, catalysts, toughening agents, flame retardants, and other additives may also be used in compositions disclosed herein. Each of these is described in more detail below.

Cycloaliphatic Epoxy Resins

The epoxy compounds may be cycloaliphatic (alicyclic) epoxides. Examples of cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, vinylcyclohexene diepoxide; limonene diepoxide; bis(3,4-epoxycyclohexylmethyl)pimelate; dicyclopentadiene diepoxide; and the like. Other suitable diepoxides of cycloaliphatic esters of dicarboxylic acids are described, for example, in U.S. Pat. No. 2,750,395.

Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2-methylcyclohexylmethyl-3,4-epoxy-2-methylcyclohexane carboxylate; 3,4-epoxy-3-methylcyclohexyl-methyl-3,4-epoxy-3-methylcyclohexane carboxylate; 3,4-epoxy-5-methylcyclohexyl-methyl-3,4-epoxy-5-methylcyclohexane carboxylate, di- or polyglycidyl ethers of cycloaliphatic polyols such as 2,2-bis(4-hydroxycyclohexyl)propane, and the like. Other suitable 3,4-epoxycyclohexylmethyl-3,4-epoxycyclohexane carboxylates are described, for example, in U.S. Pat. No. 2,890,194.

Epoxy compounds that are commercially available include vinylcyclohexene dioxide; 3,4-epoxycyclohexylmethyl-3,4-epoxycyclohexane carboxylate; 3,4-epoxy-6-methylcyclohexyl-methyl-3,4-epoxy-6-methylcyclohexane carboxylate; ERL-4221 (an epoxy resin mixture including 7-oxabicyclo[4.1.0]heptane-3-carboxylic acid and 7-oxabicyclo[4.1.0]hept-3-ylmethylester, also available from The Dow Chemical Company), bis(2,3-epoxycyclopentyl)ether; CELLOXIDE 2021, CELLOXIDE 2021P, CELLOXIDE 2021A, EPOLEAD GT301 and EPOLEAD GT401, alicyclic epoxides, diepoxides, and triepoxides available from Daicel Chemical Industries, Ltd., Japan; dipentene dioxide; flame retardant epoxy resins (such as a brominated bisphenol type epoxy resin available under the tradename D.E.R. 542, available from The Dow Chemical Company, Midland, Mich.); and resorcinol diglycidyl ether Although not specifically mentioned, other cycloaliphatic epoxy resins under the tradename designations ERL, D.E.R. and D.E.N. available from the Dow Chemical Company may also be used.

Flexibilized Cycloaliphatic Epoxy Resin

Flexibilized cycloaliphatic epoxy resins useful in embodiments disclosed herein may include epoxy resins modified with glycols, such as an aliphatic epoxy modified with polypropylene glycol; epoxidized polybutadiene; epoxidized caprolactones and caprolactones, silicone resin containing epoxy functionality; and epoxy vinylester resins, among others. In some embodiments, flexibilized epoxy resins may include bis(3,4-epoxy-6-methylcyclohexylmethyl)adipate;

bis(3,4-epoxycyclohexyl) adipate (available as ERL-4299 from The Dow Chemical Company, Midland, Mich.). In other embodiments, flexibilized epoxy resins may include (3'-4'-epoxycyclohexane)methyl 3'-4'-epoxycyclohexyl-carboxylate modified ε-caprolactone (available as CELLOXIDE 2080 series from Daicel Chemical Industries, Ltd, Japan.).

Other flexibilized epoxy resins may include polymeric epoxies include linear polymers having terminal epoxy groups (a diglycidyl ether of a polyoxyalkylene glycol, for example), polymer skeletal oxirane units (polybutadiene polyepoxide, for example) and polymers having pendant epoxy groups (such as a glycidyl methacrylate polymer or copolymer, for example.

Other flexibilized epoxy resins may include glycidated resins, epoxidized oils, and so forth. The glycidated resins are frequently the reaction product of epichlorohydrin and a bisphenol compound, such as bisphenol A; $C_4$ to $C_{28}$ alkyl glycidyl ethers; $C_2$ to $C_{28}$ alkyl- and alkenyl-glycidyl esters; $C_1$ to $C_{28}$ alkyl-, mono- and poly-phenol glycidyl ethers; polyglycidyl ethers of polyvalent phenols, such as pyrocatechol, resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphynyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms. Other examples of epoxy resins useful in embodiments disclosed herein include bis-4,4'-(1-methylethylidene)phenol diglycidyl ether and (chloromethyl)oxirane Bisphenol A diglycidyl ether.

Still other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methylmethacrylate-glycidylacrylate and a 62.5:24:13.5 methylmethacrylate-ethyl acrylate-glycidylmethacrylate.

Other flexibilized cycloaliphatic epoxy resins that may be used in various embodiments disclosed herein are described in, for example, U.S. Pat. Nos. 6,329,475, 6,329,473, 5,783,713, 5,703,195, 5,646,315, 5,585,446, 5,459,208, and 4,532,299, among others.

Novolac Resins and Multifunctional Epoxy Resins

Epoxy phenolic novolac resins useful in embodiments disclosed herein may include condensates of phenols with formaldehyde that are obtained under acid conditions, such as phenol novolacs, bisphenol A novolacs, and cresol novolacs.

Suitable multi-functional (polyepoxy) compounds may include resorcinol diglycidyl ether (1,3-bis-(2,3-epoxypropoxy)benzene), triglycidyl p-aminophenol (4-(2,3-epoxypropoxy)-N,N-bis(2,3-epoxypropyl)aniline), triglycidyl ether of meta- and/or para-aminophenol (3-(2,3-epoxypropoxy)N,N-bis(2,3-epoxypropyl)aniline), and tetraglycidyl methylene dianiline (N,N,N',N'-tetra(2,3-epoxypropyl) 4,4'-diaminodiphenyl methane), and mixtures of two or more polyepoxy compounds. A more exhaustive list of useful epoxy resins found may be found in Lee, H. and Neville, K., Handbook of Epoxy Resins, McGraw-Hill Book Company, 1982 reissue.

Other suitable epoxy resins include polyepoxy compounds based on aromatic amines and epichlorohydrin, such as N,N'-diglycidyl-aniline; N,N'-dimethyl-N,N'-diglycidyl-4,4'-diaminodiphenyl methane; N,N,N',N'-tetraglycidyl-4,4'-diaminodiphenyl methane; N-diglycidyl-4-aminophenyl glycidyl ether; and N,N,N',N'-tetraglycidyl-1,3-propylene bis-4-aminobenzoate. Epoxy resins may also include glycidyl derivatives of one or more of: aromatic diamines, aromatic monoprimary amines, aminophenols, polyhydric phenols, polyhydric alcohols, polycarboxylic acids.

Other suitable epoxy resins are disclosed in U.S. Pat. No. 5,112,932, which is incorporated herein by reference. Such epoxy resins may include epoxy terminated polyoxazolidone-containing compounds, including, for example, the reaction product of a polyepoxide compound with a polyisocyanate compound. Polyepoxides disclosed may include diglycidyl ether of 2,2-bis(4-hydroxyphenyl)propane (generally referred to as bisphenol A) and diglycidyl ether of 2,2-bis(3,5-dibromo-4-hydroxyphenyl) propane (generally referred to as tetrabromobisphenol A). Suitable polyisocyanates include 4,4'-methylene bis(phenylisocyanate) (MDI) and isomers thereof, higher functional homologs of MDI (commonly designated as "polymeric MDI"), toluene diisocyanate (TDI) such as 2,4-toluene diisocyanate and 2,6-toluene diisocyanate, m-xylylene diisocyanate, hexamethylene diisocyanate (HMDI) and isophoronediisocyanate.

Examples of epoxy phenolic novolac resins, epoxy bisphenol A novolac resins and multifunctional epoxy resins useful in various embodiments disclosed herein may include phenol-formaldehyde novolacs, such as those available under the tradenames D.E.N. 431 and D.E.N. 438 available from The Dow Chemical Company, Midland, Mich., and EPON SU-8, available from Hexion Specialty Chemicals.

Bisphenol A and Bisphenol F Based Epoxyy Resins

Other epoxy resins that may be used in various embodiments disclosed herein include 4,4'-dihydroxydiphenyl dimethyl methane (or bisphenol A), bis(4-hydroxyphenyl)methane (known as bisphenol F), diglycidyl ether of bromobisphenol A (2,2-bis(4-(2,3-epoxypropoxy)-3-bromophenyl)propane), diglycidyl ether of Bisphenol F (2,2-bis(p-(2,3-epoxypropoxy)phenyl)methane), and other epoxy resins based on bisphenol A and bisphenol F. Bisphenol-A based epoxy resins may include, for example, diglycidyl ethers of bisphenol A; D.E.R.332, D.E.R. 383, and D.E.R. 331 from The Dow Chemical Company, Midland, Mich. Bisphenol-F based epoxy resins may include, for example, diglycidyl ethers of bisphenol-F, as well as D.E.R. 354 and D.E.R. 354LV, each available from The Dow Chemical Company, Midland, Mich.

Polyether Polyols

Polyether polyols may include, for example, poly (oxyethylene) (oxypropylene) adducts of a hydroxy functional initiator or mixture of initiators having an average of at least two hydroxy groups per molecule, the initiator molecule or molecules being selected from water, glycerol, trimethylolpropane, diethylene glycol, propylene glycol, ethylene glycol, the isomers of butanetriol, pentanetriol and hexanetriol and penteerythritol, sucrose, sorbitol and the like.

Useful epoxy resins include, for example, polyglycidyl ethers of polyhydric polyols, such as ethylene glycol, triethylene glycol, 1,2-propylene glycol, 1,5-pentanediol, 1,2,6-hexanetriol, glycerol, and 2,2-bis(4-hydroxy cyclohexyl)propane; di- or polyglycidyl ethers of polyhydric alcohols such as 1,4-butanediol, or polyalkylene glycols such as polypropylene glycol, polyhydric phenols include resorcinol, 2,2-bis (4'-hydroxy-3',5'-dibromophenyl)propane, 1,1,2,2-tetrakis (4'-hydroxy-phenyl)ethane, polyglycidyl ethers of aliphatic and aromatic polycarboxylic acids, such as, for example, oxalic acid, succinic acid, glutaric acid, terephthalic acid, 2,6-naphthalene dicarboxylic acid, and dimerized linoleic acid; polyglycidyl ethers of polyphenols, such as, for example, 1,1-bis(4-hydroxyphenyl)ethane, 1,1-bis(4-hydroxyphenyl)isobutane, and 1,5-dihydroxy naphthalene; modified epoxy resins with acrylate or urethane moieties; glycidylamine epoxy resins; and novolac resins.

Other polyether polyols are described in, for example, U.S. Pat. Nos. 6,455,603, 6,245,835, 6,613,816, 5,990,185, and 5,741,847, among others Cycloaliphatic Anhydride Hardener Curable compositions disclosed herein may include one or more cycloaliphatic anhydride hardeners. Cycloaliphatic anhydride hardeners may include, for example, nadic methyl anhydride, hexahydrophthalic anhydride, trimellitic anhydride, dodecenyl succinic anhydride, phthalic anhydride, methyl hexahydrophthalic anhydride, tetrahydrophthalic anhydride, and methyl tetrahydrophthalic anhydride, among others. Anhydride curing agents may also include copolymers of styrene and maleic acid anhydrides and other anhydrides as described in U.S. Pat. No. 6,613,839, which is incorporated herein by reference.

Additional Epoxy Resins

Additional epoxy resins may be used to tailor the properties of the resulting thermoset resins as desired. The additional epoxy resin component may be any type of epoxy resin, including any material containing one or more reactive oxirane groups, referred to herein as "epoxy groups" or "epoxy functionality." Additional epoxy resins useful in embodiments disclosed herein may include mono-functional epoxy resins, multi- or poly-functional epoxy resins, and combinations thereof. Monomeric and polymeric epoxy resins may be aliphatic, aromatic, or heterocyclic epoxy resins. The epoxies may be pure compounds, but are generally mixtures or compounds containing one, two or more epoxy groups per molecule. In some embodiments, epoxy resins may also include reactive —OH groups, which may react at higher temperatures with anhydrides, organic acids, amino resins, phenolic resins, or with epoxy groups (when catalyzed) to result in additional crosslinking.

Other suitable epoxy resins are disclosed in, for example, U.S. Pat. Nos. 7,163,973, 6,887,574, 6,632,893, 6,242,083, 7,037,958, 6,572,971, 6,153,719, and 5,405,688, PCT Publication WO 2006/052727, and U.S. Patent Application Publication Nos. 20060293172 and 20050171237, each of which is hereby incorporated herein by reference.

Additional Hardeners/Curing Agents

In addition to the dicyandiamide hardeners described above, additional hardeners or curing agents may also be provided for promoting crosslinking of the epoxy resin composition to form a polymer composition. As with the epoxy resins, the additional hardeners and curing agents may be used individually or as a mixture of two or more. The curing agent component (also referred to as a hardener or crosslinking agent) may include any compound having an active group being reactive with the epoxy group of the epoxy resin. The curing agents may include nitrogen-containing compounds such as amines and their derivatives; oxygen-containing compounds such as carboxylic acid terminated polyesters, anhydrides, phenol novolacs, bisphenol-A novolacs, DCPD-phenol condensation products, brominated phenolic oligomers, amino-formaldehyde condensation products, phenol, bisphenol A and cresol novolacs, phenolic-terminated epoxy resins; sulfur-containing compounds such as polysulfides, polymercaptans; and catalytic curing agents such tertiary amines, Lewis acids, Lewis bases and combinations of two or more of the above curing agents. Practically, polyamines, diaminodiphenylsulfone and their isomers, aminobenzoates, various acid anhydrides, phenol-novolac resins and cresol-novolac resins, for example, may be used, but the present disclosure is not restricted to the use of these compounds.

Other embodiments of hardeners that may be used are described in U.S. Pat. No. 6,613,839, and include, for example, copolymers of styrene and maleic anhydride having a molecular weight ($M_w$) in the range of from 1500 to 50,000 and an anhydride content of more than 15 percent.

Other components that may be useful in the compositions disclosed herein include curing catalysts. Examples of curing catalyst include imidazole derivatives, tertiary amines, ammonium salts, phosphonium salts, and organic metallic salts. Other examples of such curing catalysts include free radical initiators, such as azo compounds including azoisobutyronitrile, and organic peroxides, such as tertiary-butyl perbenzoate, tertiary-butyl peroctoate, and benzoyl peroxide; methyl ethyl ketone peroxide, acetoacetic peroxide, cumene hydroperoxide, cyclohexanone hydroperoxide, dicumyl peroxide, and mixtures thereof. Methyl ethyl ketone peroxide and benzoyl peroxide are preferably used in the present invention.

In some embodiments, curing agents may include primary and secondary polyamines and their adducts, anhydrides, and polyamides. For example, polyfunctional amines may include aliphatic amine compounds such as diethylene triamine (D.E.H. 20, available from The Dow Chemical Company, Midland, Mich.), triethylene tetramine (D.E.H. 24, available from The Dow Chemical Company, Midland, Mich.), tetraethylene pentamine (D.E.H. 26, available from The Dow Chemical Company, Midland, Mich.), as well as adducts of the above amines with epoxy resins, diluents, or other amine-reactive compounds. Aromatic amines, such as metaphenylene diamine and diamine diphenyl sulfone, aliphatic polyamines, such as amino ethyl piperazine and polyethylene polyamine, and aromatic polyamines, such as metaphenylene diamine, diamino diphenyl sulfone, and diethyltoluene diamine, may also be used.

In some embodiments, the phenol novolac hardener may contain a biphenyl or naphthyl moiety. The phenolic hydroxy groups may be attached to the biphenyl or naphthyl moiety of the compound. This type of hardener may be prepared, for example, according to the methods described in EP915118A1. For example, a hardener containing a biphenyl moiety may be prepared by reacting phenol with bismethoxymethylene biphenyl.

In other embodiments, curing agents may include boron trifluoride monoethylamine, and diaminocyclohexane. Curing agents may also include imidazoles, their salts, and adducts. These epoxy curing agents are typically solid at room temperature. One example of suitable imidazole curing agents includes 2-phenylimidazole; other suitable imidazole curing agents are disclosed in EP906927A1. Other curing agents include aromatic amines, aliphatic amines, anhydrides, and phenols.

In some embodiments, the curing agents may be an amino compound having a molecular weight up to 500 per amino group, such as an aromatic amine or a guanidine derivative. Examples of amino curing agents include 4-chlorophenyl-N, N-dimethyl-urea and 3,4-dichlorophenyl-N,N-dimethyl-urea.

Other examples of curing agents useful in embodiments disclosed herein include: 3,3'- and 4,4'-diaminodiphenylsulfone; methylenedianiline; bis(4-amino-3,5-dimethylphenyl)-1,4-diisopropylbenzene available as EPON 1062 from Shell Chemical Co.; and bis(4-aminophenyl)-1,4-diisopropylbenzene available as EPON 1061 from Shell Chemical Co.

Thiol curing agents for epoxy compounds may also be used, and are described, for example, in U.S. Pat. No. 5,374,668. As used herein, "thiol" also includes polythiol or polymercaptan curing agents. Illustrative thiols include aliphatic thiols such as methanedithiol, propanedithiol, cyclohexanedithiol, 2-mercaptoethyl-2,3-dimercaptosuccinate, 2,3-dimercapto-1-propanol(2-mercaptoacetate), diethylene glycol bis(2-mercaptoacetate), 1,2-dimercaptopropyl methyl ether, bis(2-mercaptoethyl)ether, trimethylolpropane tris(thioglycolate), pentaerythritol tetra(mercaptopropionate), pentaerythritol tetra(thioglycolate), ethyleneglycol dithioglycolate, trimethylolpropane tris(beta-thiopropionate), tris-mercaptan derivative of tri-glycidyl ether of propoxylated alkane, and dipentaerythritol poly(beta-thiopropionate); halogen-substituted derivatives of the aliphatic thiols; aromatic thiols such as di-, tris- or tetra-mercaptobenzene, bis-, tris- or tetra-(mercaptoalkyl)benzene, dimercaptobiphenyl, toluenedithiol and naphthalenedithiol; halogen-substituted derivatives of the aromatic thiols; heterocyclic ring-containing thiols such as amino-4,6-dithiol-sym-triazine, alkoxy-4,6-dithiol-sym-triazine, aryloxy-4,6-dithiol-sym-triazine and 1,3,5-tris(3-mercaptopropyl)isocyanurate; halogen-substituted derivatives of the heterocyclic ring-containing thiols; thiol compounds having at least two mercapto groups and containing sulfur atoms in addition to the mercapto groups such as bis-, tris- or tetra(mercaptoalkylthio)benzene, bis-, tris- or tetra(mercaptoalkylthio)alkane, bis(mercaptoalkyl)disulfide, hydroxyalkyl sulfidebis(mercaptopropionate), hydroxyalkylsulfidebis(mercaptoacetate), mercaptoethyl ether bis(mercaptopropionate), 1,4-dithian-2,5-diolbis(mercaptoacetate), thiodiglycolic acid bis(mercaptoalkyl ester), thiodipropionic acid bis(2-mercaptoalkyl ester), 4,4-thiobutyric acid bis(2-mercaptoalkyl ester), 3,4-thiophenedithiol, bismuththiol and 2,5-dimercapto-1,3,4-thiadiazol.

The curing agent may also be a nucleophilic substance such as an amine, a tertiary phosphine, a quaternary ammonium salt with a nucleophilic anion, a quaternary phosphonium salt with a nucleophilic anion, an imidazole, a tertiary arsenium salt with a nucleophilic anion, and a tertiary sulfonium salt with a nucleophilic anion.

Aliphatic polyamines that are modified by adduction with epoxy resins, acrylonitrile, or (meth)acrylates may also be utilized as curing agents. In addition, various Mannich bases can be used. Aromatic amines wherein the amine groups are directly attached to the aromatic ring may also be used.

Quaternary ammonium salts with a nucleophilic anion useful as a curing agent in embodiments disclosed herein may include tetraethyl ammonium chloride, tetrapropyl ammonium acetate, hexyl trimethyl ammonium bromide, benzyl trimethyl ammonium cyanide, cetyl triethyl ammonium azide, N,N-dimethylpyrrolidinium cyanate, N-methylpyridinium phenolate, N-methyl-o-chloropyridinium chloride, methyl viologen dichloride and the like.

In some embodiments, at least one cationic photoinitiator may be used. Cationic photoinitiators include compounds that decompose when exposed to electromagnetic radiation of a particular wavelength or range of wavelengths to form a cationic species that may catalyze the polymerization reaction, such as between an epoxide group and a hydroxyl group. That cationic species may also catalyze the reaction of epoxide groups with other epoxide-reactive species contained in the curable composition (such as other hydroxyl groups, amine groups, phenolic groups, mercaptan groups, anhydride groups, carboxylic acid groups and the like).

Examples of cationic photoinitiators include diaryliodonium salts and triarylsulfonium salts. For example, a diaryliodonium salt type of photoinitiator is available from Ciba-Geigy under the trade designation IRGACURE 250. A triarylsulfonium-type photoinitiator is available from The Dow Chemical Company as CYRACURE 6992. The cationic photoinitiator may be used in a catalytically effective amount, and may constitute up to about 10 weight percent of the curable composition Catalysts In some embodiments, a catalyst may be used to promote the reaction between the epoxy resin component and the curing agent or hardener, including dicyandiamide and the phenolic hardener described above. Catalysts may include a Lewis acid, for example boron trifluoride, conveniently as a derivative with an amine such as piperidine or methyl ethylamine. Catalysts may also be basic, such as, for example, an imidazole or an amine. Other catalysts may include other metal halide Lewis acids, including stannic chloride, zinc chloride, and the like, metal carboxylate-salts such as stannous octoate and the like; benzyl dimethylamine; dimethyl aminomethyl phenol; and amines, such as triethylamine, imidazole derivatives, and the like.

Tertiary amine catalysts are described, for example, in U.S. Pat. No. 5,385,990, incorporated herein by reference. Illustrative tertiary amines include methyldiethanolamine, triethanolamine, diethylaminopropylamine, benzyldimethyl amine, m-xylylenedi(dimethylamine), N,N'-dimethylpiperazine, N-methylpyrrolidine, N-methyl hydroxypiperidine, N,N,N'N'-tetramethyldiaminoethane, N,N,N',N',N'-pentamethyldiethylenetriamine, tributyl amine, trimethyl amine, diethyldecyl amine, triethylene diamine, N-methyl morpholine, N,N,N'N'-tetramethylpropane diamine, N-methyl piperidine, N,N'-dimethyl-1,3-(4-piperidino)propane, pyridine and the like. Other tertiary amines include 1,8-diazobicyclo [5.4.0] undec-7-ene, 1,8-diazabicyclo [2.2.2]octane, 4-dimethylaminopyridine, 4-(N-pyrrolidino)pyridine, triethyl amine and 2,4,6-tris (dimethylaminomethyl)phenol.

Flame Retardant Additives

As described above, the compositions described herein may be used in formulations that contain brominated and non-brominated flame retardants. Specific examples of brominated additives include tetrabromobisphenol A (TBBA) and materials derived therefrom: TBBA-diglycidyl ether, reaction products of bisphenol A or TBBA with TBBA-diglycidyl ether, and reaction products of bisphenol A diglycidyl ether with TBBA.

Non-brominated flame retardants include the various materials derived from DOP (9,10-dihydro-9-oxa-10-phosphaphenanthrene 10-oxide) such as DOP-hydroquinone(10-(2',5'-dihydroxyphenyl)-9,10-dihydro-9-oxa-10-phosphaphenanthrene 10-oxide), condensation products of DOP with glycidyl ether derivatives of novolacs, and inorganic flame retardants such as aluminum trihydrate and aluminum phosphinite.

Toughening Agents

Toughening agents may be used to prevent the composites disclosed herein from becoming brittle when the epoxy resin cures. In some embodiments, toughening agents may be rubber compounds and block copolymers. Toughening agents function by forming a secondary phase within the polymer matrix. This secondary phase is rubbery and hence is capable of crack growth arrestment, providing improved impact toughness.

Toughening agents used to improve fracture toughness of epoxies include FORTEGRA 100, block copolymers, CTBN, amphiphillic block copolymers, linear polybutadiene-polyacrylonitrile copolymers, oligomeric polysiloxanes, and organopolysiloxane resins. Other toughening agents may include carboxyl terminated butadiene, polysulfide-based toughening agents, amine-terminated butadiene nitrile, and polythioethers. Toughening agents are described in, for example, U.S. Pat. Nos. 5,262,507, 7,087,304 and 7,037,958, and U.S. Patent Application Publication Nos. 20050031870 and 20060205856, among others. Amphiphillic toughening agents are disclosed in, for example, PCT Patent Application Publications WO2006/052725, WO2006/052726, WO2006/052727, WO2006/052729, WO2006/052730, and WO2005/097893, U.S. Pat. No. 6,887,574, and U.S. Patent Application Publication No. 20040247881.

The amount of toughening agent used in the curable compositions described herein may depend on a variety of factors including the equivalent weight of the polymers, as well as the desired properties of the products made from the composition. In general, the amount of toughening agent may be from 0.1 weight percent to 30 weight percent in some embodiments, from 0.5 weight percent to 10 weight percent in other embodiments, and from 1 weight percent to 5 weight percent in yet other embodiments, based on the total weight of the curable composition.

Optional Additives

Curable compositions and thermoset resins disclosed herein may optionally include conventional additives and fillers. Additives and fillers may include, for example, other flame retardants, boric acid, silica, glass, talc, metal powders, titanium dioxide, wetting agents, pigments, coloring agents, mold release agents, coupling agents, ion scavengers, UV stabilizers, flexibilizing agents, and tackifying agents. Additives and fillers may also include fumed silica, aggregates such as glass beads, polytetrafluoroethylene, polyol resins, polyester resins, phenolic resins, graphite, molybdenum disulfide, abrasive pigments, viscosity reducing agents, boron nitride, mica, nucleating agents, and stabilizers, among others. Fillers and modifiers may be preheated to drive off moisture prior to addition to the epoxy resin composition. Additionally, these optional additives may have an effect on the properties of the composition, before and/or after curing, and should be taken into account when formulating the composition and the desired reaction product. Curable compositions disclosed herein may also optionally contain other additives of a generally conventional type including for example, stabilizers, other organic or inorganic additives, pigments, wetting agents, flow modifiers, UV light blockers, and fluorescent additives. These additives may be present in amounts of from 0 to 5 weight-percent in some embodiments, and less than 3 weight percent in other embodiments. Examples of suitable additives are also described in U.S. Pat. No. 5,066,735 and PCT/US2005/017954.

Organic solvents may be used in some embodiments, including ketones, such as methyl ethyl ketone (MEK), glycol ethers, such as propylene glycol methyl ether, and alcohols, such as methanol. In some embodiments, minor amounts of higher molecular weight, relatively non-volatile monoalcohols, polyols, and other epoxy- or isocyanato-reactive diluents may also be used, if desired, to serve as plasticizers in the curable and thermoset compositions disclosed herein.

Curable Compositions

Curable compositions may be formed by combining a mixture of cycloaliphatic epoxy resins or a mixture of a) a cycloaliphatic epoxy resin, b) one or more of a flexibilized cycloaliphatic resin, an epoxy phenolic novolac resin, an epoxy bisphenol A novolac resin, a multifunctional epoxy resin, a bisphenol-A or bisphenol F based epoxy resin, and a polyether polyol, c) a catalyst, and d) a cycloaliphatic anhydride hardener. Additional hardeners, epoxy resins, catalysts, toughening agents and other additives may also be added, as described above. The relative proportions of the epoxy resin mixtures and the cycloaliphatic anhydride hardener may depend, in part, upon the properties desired in the curable composition or thermoset compositions to be produced, the desired cure response of the composition, and the desired storage stability of the composition (desired shelf life).

In some embodiments, the epoxy resin mixture (a mixture of cycloaliphatic epoxy resins or a mixture of cycloaliphatic and other epoxy resins as described above) may be present in the curable composition in an amount ranging from 0.1 to 99 weight percent of the curable composition, based on the total weight of the epoxy resin mixture, the catalyst and the cycloaliphatic anhydride hardener. In other embodiments, the epoxy composition may range from 5 to 95 weight percent of the curable composition; from 15 to 85 weight percent in other embodiments; from 25 to 75 weight percent in other embodiments; from 35 to 65 weight percent in other embodiments; and from 40 to 60 weight percent in yet other embodiments, where the above percentages are based on the total weight of the epoxy resin mixture, the catalyst, and the cycloaliphatic anhydride hardener.

In some embodiments, the cycloaliphatic anhydride hardener or a mixture of cycloaliphatic anhydride hardeners may be present in the curable composition in an amount ranging from 0.1 to 99 weight percent of the curable composition, based on the total weight of the epoxy resin mixture, the catalyst, and the cycloaliphatic anhydride hardener. In other embodiments, the cycloaliphatic anhydride hardener may range from 5 to 95 weight percent of the curable composition; from 15 to 85 weight percent in other embodiments; from 25 to 75 weight percent in other embodiments; from 35 to 65 weight percent in other embodiments; and from 40 to 60 weight percent in yet other embodiments, where the above percentages are based on the total weight of the epoxy resin mixture, the catalyst, and the cycloaliphatic anhydride hardener.

In some embodiments, a catalyst may be present in the curable composition in an amount ranging from 0.01 weight percent to 10 weight percent. In other embodiments, the catalyst may be present in an amount ranging from 0.1 weight percent to 8 weight percent; from 0.5 weight percent to 6 weight percent in other embodiments; and from 1 to 4 weight percent in yet other embodiments, where the above ranges are based on the total weight of the epoxy resin mixture, the catalyst, and the cycloaliphatic anhydride hardener.

Additional epoxy resins may be used in some embodiments of the curable compositions in an amount ranging from 0.01 weight percent to 20 weight percent, based on the total weight of the curable composition. In other embodiments, additional epoxy resins may be present in an amount ranging from 0.1 weight percent to 8 weight percent; from 0.5 weight percent to 6 weight percent in other embodiments; and from 1 to 4 weight percent in yet other embodiments.

Additional hardeners may be used in some embodiments of the curable compositions in an amount ranging from 0.01 weight percent to 20 weight percent, based on the total weight of the curable composition. In other embodiments, additional hardeners may be present in an amount ranging from 0.1 weight percent to 8 weight percent; from 0.5 weight percent to 6 weight percent in other embodiments; and from 1 to 4 weight percent in yet other embodiments.

Curable compositions may also include from about 0.1 to about 50 volume percent optional additives in some embodiments, based on the total volume of the curable composition. In other embodiments, curable compositions may include from about 0.1 to about 5 volume percent optional additives; and from about 0.5 to about 2.5 volume percent optional additives in yet other embodiments.

Substrates

The curable compositions described above may be disposed on a substrate and cured. The substrate is not subject to particular limitation. As such, substrates may include metals, such as stainless steel, iron, steel, copper, zinc, tin, aluminum, alumite and the like; alloys of such metals, and sheets which are plated with such metals and laminated sheets of such metals. Substrates may also include polymers, glass, and various fibers, such as, for example, carbon/graphite; boron; quartz; aluminum oxide; glass such as E glass, S glass, S-2 GLASS ® or C glass; and silicon carbide or silicon carbide fibers containing titanium. Commercially available fibers may include: organic fibers, such as KEVLAR from DuPont; aluminum oxide-containing fibers, such as NEXTEL fibers from 3M; silicon carbide fibers, such as NICALON from Nippon Carbon; and silicon carbide fibers containing titanium, such as TYRRANO from Ube. In particular embodiments, the curable compositions may be used to form at least a portion of a circuit board or a printed circuit board. In some embodiments, the substrate may be coated with a compatibilizer to improve the adhesion of the curable or cured composition to the substrate.

Composites and Coated Structures

In some embodiments, composites may be formed by curing the curable compositions disclosed herein. In other embodiments, composites may be formed by applying a curable composition to a substrate or a reinforcing material, such as by impregnating or coating the substrate or reinforcing material, and curing the curable composition.

The above described curable compositions may be in the form of a powder, slurry, or a liquid. After a curable composition has been produced, as described above, it may be disposed on, in, or between the above described substrates, before, during, or after cure of the curable composition.

For example, a composite may be formed by coating a substrate with a curable composition. Coating may be performed by various procedures, including spray coating, curtain flow coating, coating with a roll coater or a gravure coater, brush coating, and dipping or immersion coating.

In various embodiments, the substrate may be monolayer or multi-layer. For example, the substrate may be a composite of two alloys, a multi-layered polymeric article, and a metal-coated polymer, among others, for example. In other various embodiments, one or more layers of the curable composition may be disposed on or in a substrate. Other multi-layer composites, formed by various combinations of substrate layers and curable composition layers are also envisaged herein.

In some embodiments, the heating of the curable composition may be localized, such as to avoid overheating of a temperature-sensitive substrate, for example. In other embodiments, the heating may include heating the substrate and the curable composition.

Curing of the curable compositions disclosed herein may require a temperature of at least about 30° C., up to about 250° C., for periods of minutes up to hours, depending on the resin composition, hardener, and catalyst, if used. In other embodiments, curing may occur at a temperature of at least 100° C., for periods of minutes up to hours. Post-treatments may be used as well, such post-treatments ordinarily being at temperatures between about 100° C. and 250° C.

In some embodiments, curing may be staged to prevent exotherms. Staging, for example, includes curing for a period of time at a temperature followed by curing for a period of time at a higher temperature. Staged curing may include two or more curing stages, and may commence at temperatures below about 180° C. in some embodiments, and below about 150° C. in other embodiments.

In some embodiments, curing temperatures may range from a lower limit of 30° C., 40° C., 50° C., 60° C., 70° C., 80° C., 90° C., 100° C., 110° C., 120° C., 130° C., 140° C., 150° C., 160° C., 170° C., or 180° C. to an upper limit of 250° C., 240° C., 230° C., 220° C., 210° C., 200° C., 190° C., 180° C., 170° C., 160° C., where the range may be from any lower limit to any upper limit.

The curable compositions and composites described herein may be useful as adhesives, structural and electrical laminates, coatings, castings, structures for the aerospace industry, and as circuit boards and the like for the electronics industry, among other applications. The curable compositions disclosed herein may also be used in electrical varnishes, encapsulants, semiconductors, general molding powders, filament wound pipe, storage tanks, liners for pumps, and corrosion resistant coatings, among others. In selected embodiments, the curable compositions described herein may be useful in the formation of resin coated foils, similar to those as described in U.S. Pat. No. 6,432,541, which is incorporated herein by reference.

Various processing techniques can be used to form composites containing the epoxy-based compositions disclosed herein. For example, filament winding, solvent prepregging, and pultrusion are typical processing techniques in which the uncured epoxy resin may be used. Moreover, fibers in the form of bundles may be coated with the uncured epoxy resin composition, laid up as by filament winding, and cured to form a composite.

The epoxy resin compositions and composites described herein may be useful as adhesives, structural and electrical laminates, coatings, castings, structures for the aerospace industry, as circuit boards and the like for the electronics industry, as well as for the formation of composites, pultruded composites, pultruded rods, skis, ski poles, fishing rods, and other outdoor sports equipment. The epoxy compositions disclosed herein may also be used in electrical varnishes, encapsulants, semiconductors, general molding powders, filament wound pipe, storage tanks, liners for pumps, and corrosion resistant coatings, among others.

EXAMPLES

Samples 1-6

Samples 1-6 are prepared by mixing epoxy resins and hardeners, as indicated in Table 1, at ambient temperatures. ERL-4221 is a cycloaliphatic epoxy resin mixture, having about 85 weight percent 7-oxabicyclo[4.1.0]heptane-3-carboxylic acid and 7-oxabicyclo[4.1.0]hept-3-ylmethylester, the remainder being about 10 weight percent soluble oligomer, and 5 weight percent monoepoxides of 3-cyclohexenyl-methyl-3-cyclohexene carboxylate and 3-cyclohexen-1-ylmethyl ester, available from The Dow Chemical Company, Midland, Mich. ERL-4229 is bis(3,4-epoxycyclohexyl)adipate, available from The Dow Chemical Company, Midland, Mich. D.E.R. 331 is a bisphenol-A based epoxy resin (a liquid reaction product of epichlorohydrin and bisphenol-A) available from The Dow Chemical Company, Midland, Mich. D.E.N. 438 is an epoxy novolac resin (a semi-solid reaction product of epichlorohydrin and phenol-formaldehyde novolac) available from The Dow Chemical Company, Midland, Mich. Lindride LS-252LV is an anhydride curing agent available from Lindau Chemicals, Inc., Columbia, S.C. The mixtures are degassed, and castings are prepared by pouring the formulations in open molds. The castings are then cured in a ventilated oven for 1 minute at 200° C. Following cure, the castings are allowed to cool to ambient temperature. Formulations of the curable epoxy compositions are given in Table 1.

TABLE 1

Sample Formulations (given as wt. % of raw materials)

| | Sample | | | | | |
|---|---|---|---|---|---|---|
| | 1 | 2 | 3 | 4 | 5 | 6 |
| ERL-4221 | 32.4 | 28.8 | 28.8 | 29.2 | 28.9 | 28.8 |
| ERL-4299 | — | — | — | 12.5 | — | — |
| D.E.R. 383 | — | 3.3 | — | — | — | 6.2 |
| D.E.R. 331 | — | — | — | — | 6.2 | — |
| D.E.N. 438 | 8.1 | 9.1 | 12.4 | — | 6.2 | 6.2 |
| LS-252LV | 59.6 | 58.7 | 58.9 | 58.3 | 58.8 | 58.9 |

Various properties of the castings produced from the curable compositions (Samples 1-3) are measured, including glass transition temperature ($T_g$) via both DSC (first scan) and DMTA (tan-δ peak), and tensile properties (ASTM D638). The properties of the castings produced from curable compositions are given in Table 2.

Glass transition temperature is measured using differential scanning calorimetry (DSC) using IPC Method IPC-TM-650 2.4.25. Measurement of glass transition temperature by DSC is performed using a Q100 DSC from T.A. Instruments, set up for 10° C./min scans. Sample sizes are kept under 15 mg. Hermetic pans with holes punched in the lids are used to contain the samples in the DSC cell. DSC scans are analyzed for final $T_g$ using half extrapolated tangents ($T_g$ analysis).

DMTA is run on three rectangular samples, as per ASTM D5045, at an angular frequency of 1 Hz and 0.1% strain. The temperature range chosen for these tests is between 30 and 2800° C. The sample size is typically 17 mm long, 13 mm wide and 4 mm thick. The samples are inserted between adjustable clamps and the clamps are closed using a torque wrench. The samples are then subjected to oscillations in torsion mode. Samples are subjected to a dynamic temperature ramp at 3° C./min. A slower heating rate of 3° C./min is employed to maintain thermal equilibrium and considering the thermal mass of the sample. Storage and Loss modulus as well as Tangent delta are recorded.

TABLE 2

| | Sample 1 | Sample 2 | Sample 3 | Sample 4 | Sample 5 | Sample 6 |
|---|---|---|---|---|---|---|
| Properties | | | | | | |
| $T_g$ (DSC) (° C.) | 236.2 | 226.5 | 228.7 | 224.2 | 226.5 | 216.6 |
| $T_g$ (DMTA) (° C.) | 231.7 | 226.1 | 230.4 | 224.9 | 226.1 | 222.7 |
| Tensile Properties | | | | | | |
| Modulus (psi) | 278079 | 280297 | 272074 | 266931 | 280297 | 281755 |
| Peak Stress (psi) | 7438 | 7856 | 7232 | 7279 | 7856 | 7534 |
| Elongation at Break (%) | 5.3 | 6.0 | 5.4 | 5.2 | 6.0 | 5.4 |

As illustrated by the results in Table 2, curable compositions having fast cure rates (high reactivity), low viscosity (typically 1000-3000 cps, as measured by ASTM D-445 at 25° C.), high glass transition temperatures, and high tensile strength, modulus, and elongation may be formed using mixtures of cycloaliphatic epoxy resins or mixtures of cycloaliphatic and bisphenol-A epoxy resins when cured with cycloaliphatic anhydrides according to embodiments disclosed herein.

As described above, curable epoxy resin compositions disclosed herein may include an admixture of cycloaliphatic epoxy resins or an admixture of a cycloaliphatic epoxy resin and a bisphenol-A based epoxy resin and one or more cycloaliphatic anhydride hardeners. Such compositions may exhibit low viscosities and high reactivity, suitable for use in composites and coating applications. Upon cure, such as a thermal cure, the resulting thermoset resins may have a good balance of physical properties, including a high glass transition temperature, a high tensile strength, a high tensile modulus, and a high elongation at break.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A curable composition comprising an epoxy resin mixture, wherein the epoxy resin mixture comprises 70 weight percent to 100 weight percent of cycloaliphatic epoxy resins based on a total weight of the epoxy resin mixture; a cycloaliphatic anhydride hardener; greater than 10 to 30 weight percent of a toughening agent based on the total weight of the curable composition; and a catalyst that includes a metal carboxylate salt.

2. The curable composition of claim 1, wherein the curable composition includes from about 35 to about 65 weight percent of the cycloaliphatic anhydride hardener; and from 0.01 to about 10 weight percent of the catalyst; and wherein the weight percentages given are based on the combined weight of the epoxy resin mixture, hardener, toughening agent, and catalyst.

3. The curable composition of claim 1, wherein the cycloaliphatic anhydride hardener is nadic methyl anhydride.

4. The curable composition of claim 1, further including at least one of an epoxy phenolic novolac resin, an epoxy bisphenol-A novolac resin, a multifunctional epoxy resin, a bisphenol-A based epoxy resin, a bisphenol-F based epoxy resin, a polyether polyol or a combination thereof.

5. The curable composition of claim 1, where the toughening agent includes a rubber compound.

6. The curable composition of claim 1, wherein the catalyst further includes at least one tertiary amine, phosphonium salt, ammonium salt, imidazole, metal oxide or a combination thereof.

7. A toughened thermoset resin, comprising the reaction product of the curable composition of claim 1.

8. The curable composition of claim 1, wherein the curable composition when cured forms a reaction product, the resulting reaction product having (i) a glass transition temperature greater than or equal to about 210° C. as measured by differential scanning calorimetry or dynamic mechanical thermal analysis; (ii) a tensile modulus of at least about 260000 psi; (iii) an elongation at break of at least about 5 percent; and (iv) a peak stress of at least about 7000 psi.

* * * * *